(12) United States Patent
Pizzigalli (10) Patent No.: US 12,225,920 B2
(45) Date of Patent: Feb. 18, 2025

(54) FIBRE-BASED COMPOSITION AND USE THEREOF FOR THE PREPARATION OF FOOD PRODUCTS

(71) Applicant: HI-FOOD S.p.A., Parma (IT)

(72) Inventor: Emanuele Pizzigalli, Berceto (IT)

(73) Assignee: HI-FOOD S.P.A., Parma (IT)

( * ) Notice: Subject to any disclaimer, the term of this patent is extended or adjusted under 35 U.S.C. 154(b) by 1027 days.

(21) Appl. No.: 17/052,289

(22) PCT Filed: May 2, 2019

(86) PCT No.: PCT/IB2019/053590
§ 371 (c)(1),
(2) Date: Nov. 2, 2020

(87) PCT Pub. No.: WO2019/211785
PCT Pub. Date: Nov. 7, 2019

(65) Prior Publication Data
US 2021/0084954 A1   Mar. 25, 2021

(30) Foreign Application Priority Data

May 3, 2018   (IT) .................. 102018000005020

(51) Int. Cl.
| A23L 29/30 | (2016.01) |
| A21D 2/36 | (2006.01) |
| A21D 13/062 | (2017.01) |
| A21D 13/066 | (2017.01) |
| A21D 13/068 | (2017.01) |

(Continued)

(52) U.S. Cl.
CPC .............. *A23L 29/35* (2016.08); *A21D 2/36* (2013.01); *A21D 13/062* (2013.01); *A21D 13/066* (2013.01); *A21D 13/068* (2013.01); *A23L 2/52* (2013.01); *A23L 7/115* (2016.08);
(Continued)

(58) Field of Classification Search
CPC . A23L 29/35; A23L 2/52; A23L 7/115; A23L 7/126; A23L 29/231; A23L 33/22; A21D 2/36; A21D 13/062; A21D 13/066; A21D 13/068
See application file for complete search history.

(56) References Cited

U.S. PATENT DOCUMENTS

2006/0093720 A1   5/2006   Tatz

FOREIGN PATENT DOCUMENTS

| WO | 97/19603 A1 | 5/1997 | |
| WO | WO-2008057571 A1 * | 5/2008 | ............... A23G 3/42 |

OTHER PUBLICATIONS

David Dalgetty, "Fortfication of Bread with Hulls and Cotyledon Fibers Isolated from Peas, Lentils, and Chickpeas", Cereal Chem 83(3), pp. 269-274, 2006.

(Continued)

*Primary Examiner* — Katherine D Leblanc
(74) *Attorney, Agent, or Firm* — Silvia Salvadori, P.C.; Silvia Salvadori (57) ABSTRACT

The present invention relates to a composition, preferably a fibre-based food composition, and the use thereof for the preparation of sugar-free, fat-free and/or allergen-free (in particular gluten-free) food products with a reduced or low calorie content. The invention also relates to a process for the preparation of the composition of the invention and food products obtained with the composition, as well as a kit for using the composition.

20 Claims, 3 Drawing Sheets

(51) Int. Cl.
  *A23L 2/52*    (2006.01)
  *A23L 7/10*    (2016.01)
  *A23L 7/126*   (2016.01)
  *A23L 29/231*  (2016.01)
  *A23L 33/22*   (2016.01)
(52) U.S. Cl.
  CPC ............ *A23L 7/126* (2016.08); *A23L 29/231* (2016.08); *A23L 33/22* (2016.08); *A23V 2002/00* (2013.01)

(56) References Cited

OTHER PUBLICATIONS

MoisturLok—Advanced Ingredients, Every R&D; Projects Starts with Advanced Ingredients [retrieved from internet] May 11, 2018; https://web.archive.org/web/20150128154934/http://www.advancedingredients.com/products/moisturlok,php.
Vania Urias-Orona, "A Novel Pectin Material: Extraction, Characterization and Gelling Properties", International Journal of Molecular Sciences, 2010, 11, pp. 3686-3695.

\* cited by examiner

FIBRE-BASED COMPOSITION AND USE THEREOF FOR THE PREPARATION OF FOOD PRODUCTS

This application is a national stage application of PCT-application number PCT/IB2019/053590 filed on May 2, 2019, which claims priority of Italian patent application No. 102018000005020 filed on May 3, 2018, both disclosures are incorporated herein by reference.

TECHNICAL FIELD

The present invention relates to a composition, preferably a fibre-based food composition, and the use thereof for the preparation of sugar-free, fat-free and/or allergen-free (in particular gluten-free) food products with a reduced or low calorie content. The invention also relates to a process for the preparation of the composition of the invention and food products obtained with the composition, as well as a kit for using the composition.

STATE OF THE ART

Over the past 40 years, obesity and the diseases connected to it, such as type 2 diabetes, hypertension, cardiovascular diseases, respiratory problems (sleep apnoea), metabolic syndrome and tumours, have become one of the largest health problems of modern society. Problems of overweight and obesity have almost tripled in many parts of the world, especially in the most developed countries where, along with a sedentary lifestyle, there is a large availability of food, often easily found at a low cost.

In order to limit the health consequences deriving from the consumption of foods with a high calorie content (typically containing high levels of fats and/or sugars), many people consume so called "sugar-free" foods, or foods "with no added sugars" and "low fat".

Consumer demand for this type of products is continuously and rapidly growing and is representing a major challenge for operators in the industry, since replacing sugars and/or fats in food products strongly impacts the organoleptic properties of the product.

In fact, both sugars and fats impart not only sweetness and energy, but also other properties to food products, in particular structure, body, sensation on the palate and flavour. In addition, sugar also imparts moisture, binding properties, stability at low and high temperatures and a longer shelf life to foods.

For example, in oven-baked products sugars reduce the activity of water by immobilising it: they thus act as humectants, thereby making it possible to influence the moisture of the finished product. In addition, they condition the gelatinisation temperature of starches during baking, thus playing a significant role in imparting structure, volume and softness to the finished product. In ice cream, sugars lend texture, viscosity and a pleasing sensation on the palate, as well as lowering the freezing point; in semi-solid edible products, they contribute to the basic texture of the product.

In beverages, the primary function of sugars is to provide sweetness. For this reason, it is generally possible to replace them using high-intensity sweeteners which are known in the industry, since the other functional properties are not strictly necessary.

This does not apply for a series of other food products (typically solid or semi-solid products), in which simply reproducing the sweetness provided by traditional sugars by replacing them with high-intensity sweeteners or other ingredients is not sufficient to obtain a palatable product, precisely because high-intensity sweeteners do not provide all the other properties typical of sugar: structure, body, sensation on the palate, binding properties, moisture, stability at low and high temperatures and a longer shelf life.

In the case of replacement of sugars with high-intensity sweeteners or known alternative sweeteners, the food product must be completely reformulated with the addition of additives (such as, for example, texturing agents, stabilizers, gums, hydrocolloids, suspension agents, thickeners, preservatives, etc.) capable of imparting to the product the sensation on the palate, structure, texture, body, moisture, stability at low and high temperatures, binding properties and shelf life typical of sugar.

In the present state of the art, many efforts have been dedicated to obtaining compositions that may replace sugars in food products without altering the organoleptic and structural properties that are imparted by them.

WO 97/19603 discloses a process for the conversion of fibre-based materials (bran, skins or other food waste materials) in an insoluble, gellable fibre-based product for the preparation of a variety of foods with a reduced calorie and fat content.

The process described in this document envisages two main steps that lead to the total breakdown of the fibre cell structure in the starting material. In the first step the starting material, finely ground, is mixed together with an alkaline aqueous solution (pH 9-14) and subjected to a physical mixing and grinding action (for example, with the use of an autoclave, jet cooker or extruder) at a high temperature (75-150° C.), which enables the separation of the fibres into the respective soluble and insoluble fractions. The gellable product is contained in the insoluble fraction (solid phase) and is thus separated from the mixture.

The solid phase thus separated is then re-dispersed in an aqueous solution and subjected to the second step of the process, which requires the presence of an oxidising agent (such as, for example, hydrogen peroxide) employed for the purpose of removing any residual colouring and increasing the properties of rehydration of the finished product. In this second step, the mixture is again subjected to a physical mixing and grinding action at a high temperature and, finally, the solid phase is again separated from the mixture in order to remove all of the soluble and coloured components present. The final product is in the form of a hydrated gel that can be dried and subsequently rehydrated, preferably in the presence of hydrophilic substances (such as, for example, maltodextrins, starches, hemicellulose, hydrolysed starches, etc.), which can be added to the gel prior to drying and enable the maximum degree of rehydratability to be obtained in the subsequent hydration step.

US2006/0093720 describes an aqueous food composition with a reduced calorie content, used as a sugar substitute in the preparation of food products such as cakes, bread, ice cream, etc. Said composition acts as a veritable sugar substitute, since it contains polyols (also called "sugar alcohols"), also definable as low-calorie sweeteners, in combination with high-intensity sweeteners (for example aspartame, acesulfame K, saccharine, etc.). The composition thus has a high sweetening power (similar to that of sugar) due to the synergistic effect that occurs between the polyols and high-intensity sweeteners. The composition also comprises insoluble fibres that are resistant to human digestive enzymes and do not dissolve in water. The insoluble fibres comprise cellulose, hemicellulose and lignin. Examples of insoluble fibres are corn, wheat and barley bran.

The composition also contains a gelling agent, which can be agar, alginates, pectin, gelatine, xanthan gum, chitosan, modified starch, etc.

The composition also comprises a gelling activator, typically a calcium salt. The composition optionally also comprises a thickening agent, which can be, for example, gelatine, alginates, polysaccharides, etc.

Example 1 of US2006/0093720 describes a composition comprising polyol sorbitol and water as the main ingredients (representing over 90% of the composition), in combination with sodium alginate, guar gum, dehydrated calcium sulphate (which act, respectively, as a gelling agent, thickener and gelling activator); also present is an amount equal to 0.5% of wheat fibre and other food additives: propylene glycol (humectant), neotame (sweetener) and potassium sorbate (preservative).

The composition of US2006/0093720 is therefore a composition with a low calorie content, but a high sweetening power, which can be used in place of sugars for the preparation exclusively of sweet foods. It is precisely the sweet flavour of this composition which represents the main disadvantage for a versatile use in the preparation of sweet and savoury foods.

In fact, there is a strongly felt need in the industry to have a composition capable of replacing the characteristics of sugar in terms of structure, body, sensation on the palate, binding properties, moisture, stability at low and high temperatures and shelf life without, however, having any flavour, so that it can be used in a versatile manner for any sweet or savoury food preparation, leaving the choice of the flavour to be attributed to the food up to the end user.

A further disadvantage of the composition of US2006/0093720 is represented by the fact that the consumption of an excessive amount of polyols can lead, in some individuals, to a laxative effect. For this reason, in accordance with Regulation (EU) no. 1333/2008, if a product contains more than 10% by weight of polyols, it is mandatory to declare the presence thereof on the label. It is important to note that at present the demand for so-called "clean label" products is increasingly evident, with a consequent growth, within the market, of consumer demand for semi-finished and/or finished products without additives or preservatives, as consumers are more and more concerned and careful about choosing the products they buy.

However, the composition of US2006/0093720 contains additives such as humectants, thickeners, gelling agents, gelling activators and preservatives (in addition to the presence of polyols in an amount greater than 10% by weight), which precludes classifying it as a "clean label" product.

In the composition of US2006/0093720, the properties of texture and body typical of sugar are obtained with the aid also of these additives (thickeners, humectants, gelling agents and gelling activators).

It is evident, therefore, that in this sector there remains a need to provide a composition, preferably for food use, which can be used for the preparation of foods with a reduced or low calorie content and which:

is flavourless (and thus can be used in a versatile manner for the preparation of different types of foods with different tastes and flavours); in particular, the composition must be free of sweeteners or other additives that alter the flavour of the composition;

acts positively on the structural properties of the food into which it is incorporated, imparting body, a sensation on the palate, binding properties, moisture, stability at low and high temperatures and a longer shelf life;

is free of additives such as preservatives, humectants, gelling agents etc. that would preclude its classification as a "clean label" composition;

has a content of caloric sweetener (sugar) that is almost nil, so that it can be classified as "sugarless" or "with no added sugars" or "sugar free";

does not contain gluten or other allergens and is thus suitable for the preparation of foods that are both gluten free and sugar free at the same time.

A composition having the characteristics listed above, i.e. sugar free (reduced or low calorie content), flavourless (with no added sweeteners), free of additives (clean label), gluten free and more in general allergen free and capable of imparting to the food product the body and structure typical of sugar, is provided by the present invention together with a process for the preparation thereof, as well as food products prepared with said composition.

OBJECT OF THE INVENTION

The present invention relates to an aqueous composition comprising:

dextrins that are obtained from the partial hydrolysis of starch, definable as partially digestible soluble fibre; and vegetable bran (rich in insoluble and non-digestible fibres) containing from 2% to 10% by weight of pectins.

The composition comprises an amount of caloric sugars 0.5% by weight relative to the total weight of the composition and is thus classifiable as a "sugar free" composition or a composition "with no added sugar".

The composition preferably does not contain food additives selected from among thickening agents, humectants, gelling agents, preservatives and gelling activators.

The composition is preferably free of sweeteners and is flavourless.

The invention also relates to a food product comprising the composition of the invention (hence a food product prepared with the composition of the invention) selected from among: a sweet or savoury oven-baked product, a ready-made mix that can be used to prepare the sweet or savoury oven-baked product, fruit, cereal and/or granola bars, drinks, cold desserts, sweet or savoury sauces or sweet or savoury salad dressings.

The invention also relates to a kit comprising the composition of the invention and instructions for using the composition and possibly one or more ingredients for preparing a sweet or savoury food.

The invention also relates to a process for preparing the aqueous composition, wherein the dextrins deriving from the partial hydrolysis of starch are mixed with water, heated, have bran added to them and are finally heated again. Alternatively, the dextrins and the bran are added simultaneously to water to obtain a mixture that is heated to obtain the composition of the invention with a semi-solid or syrupy consistency.

DETAILED DESCRIPTION OF PREFERRED EMBODIMENTS OF THE INVENTION

The term "sugar free" or "sugarless" or "with no added sugar" indicates that the content of traditional caloric sugars, understood as xylose, ribose, glucose, lactose, mannose, galactose, fructose, dextrose, sucrose, maltose, fructo-oligosaccharide syrups, corn syrup, glucose syrup, rice syrup, malt syrup, maple syrup, honey, etc. is less than 0.5% by weight.

The content of caloric sugars in the composition is determined with standard techniques, for example by high-performance liquid chromatography (HPLC).

The term "caloric sugar" or "caloric sugar syrup" or "caloric sweetener" indicates a caloric or nutrient substance that is metabolised in the body to produce energy. Such substances include monosaccharides, disaccharides, polysaccharides and mixtures thereof that supply a caloric input of about 3-4 kcal/g. Examples can include xylose, ribose, glucose, lactose, mannose, galactose, fructose, dextrose, sucrose, maltose, fructo-oligosaccharide syrups, corn syrup, glucose syrup, rice syrup, malt syrup, maple syrup, honey, etc.

The term "with no added sugar" or "with no added sweeteners" indicates there are no high-intensity sweeteners or other sweeteners that are alternatives to caloric sweeteners. The sweeteners that are alternatives to caloric sweeteners are, for example, polyols. Polyols are "sugar alcohols" characterised by a sweet flavour and low calories. Examples of polyols are erythritol, mannitol, lactitol, isomalt, maltitol, xylitol, sorbitol, glycerol and hydrogenated starch hydrolysates (HSH).

The term "high-intensity sweeteners" indicates a sweetening agent which has a sweetness from 30 to 13000 times greater than that of sucrose. High-intensity sweeteners commonly used in the industry can include sweeteners based on dipeptides such as aspartame (L-aspartyl-L-phenylalanine methyl ester) and equivalents; alitame (L-α-aspartyl-N-(2, 2,4,4-tetramethyl-3-thietanyl)-D-alaninamide hydrate) and equivalents; saccharine and the salts thereof (for example, sodium or calcium salt); cyclamate and the salts thereof; acesulfame K; chlorinated derivatives of sucrose such as, for example, sucralose (4,1',6'-trichloro-4,1',6'-trideoxysucrose); maltol (3-hydroxy-2-methyl-4-pyrone); ethyl maltol; dihydrochalcones such as neohesperidin dihydrochalcone; *stevia*-based sweeteners such as stevioside and rebaudioside; glycyrrhizin; monoammonium glycyrrhizinate; and protein-based sweeteners such as thaumatin etc. High-intensity sweeteners can be considered "non-caloric sweeteners" as they have a higher sweetening power than caloric sweeteners and it is possible to use them in such a small amount as to introduce few or no calories, and thus much less energy compared to a caloric sweetener while providing the same degree of sweetness.

The terms "partially hydrolysed starch", "dextrin" or "soluble fibre" are used as synonyms for the purposes of the present invention.

The term "fibre" refers to a heterogeneous group of compounds, classified in accordance with their chemical structure and their chemical/physical properties, and which share the characteristic of being resistant to the digestive enzymes of the human body. That is, once the fibre is ingested, it reaches the large intestine remaining essentially unchanged.

The term "insoluble fibre" means a fibre that is not easily dispersible in water.

The term "soluble fibre" means a fibre that is easily dispersible in water.

The term "soluble and insoluble solid substances" means all those substances which can be easily dispersible and not easily dispersible in water, respectively.

The term "bran" indicates the fibrous external part of a seed, also called peel, outer coating, skin, shell, etc.

The term "with no added additives" indicates the absence of preservative agents, humectants, gelling agents, stabilisers, gelling catalysts, antioxidants, colourants, acidity correctors, emulsifiers, anti-caking agents and flavour enhancers.

The term "preservative" means a substance used to impart microbiological stability to a product. Examples of preservatives are: E200 Sorbic acid, E202 Potassium sorbate, E203 Calcium sorbate, E260 Acetic acid, E261 Potassium acetate, E262 Sodium acetates, E263 Calcium acetate, E270 Lactic acid, E290 Carbon dioxide, E210 Benzoic acid, E211 Sodium benzoate, E212 Potassium benzoate, E213 Calcium benzoate, E220 Sulphur dioxide, E223 Sodium metabisulphite, E224 Potassium metabisulphite and E225 Calcium metabisulphite.

The term "stabiliser" refers to the class of substances that are used to keep in suspension a material that is insoluble or only dispersible within a system with a liquid phase such as water. Examples of stabilisers are xanthan gum (E415) or gellan gum (E418).

The term "gelling agent" refers to substances such as carrageenan, alginates, pectins, carob gum, guar gum or chemically modified cellulose.

The term "humectant" means a class of hygroscopic substances which, as such, absorb water from the surrounding atmosphere. Examples of humectants are glycerine, propylene glycol, and polyols such as sorbitol, xylitol, mannitol and maltitol.

The term "gelling catalysts" refers to reagents that are introduced into foods or food preparations as additives. They modulate the gelling processes involving hydrocolloids or other gelling additives. For example, catalysts of gelling processes involving sodium alginate are: calcium sulphate, calcium acetate, calcium citrate, calcium chloride, neutral potassium pyrophosphate, tricalcium phosphate, sodium carbonate, calcium carbonate, and organic acids such as acetic, citric, lactic, sorbic and malic acid.

"Water activity" refers to an index relating to the amount of water which, in a given product, is free of particular bonds with other components, and thus the amount of water (expressed in a nondimensional value ranging between 0 and 1) available for chemical and biological reactions.

The term "flavourless", "tasteless" or "unflavoured" means a very neutral product with respect to its flavour characteristics and which does not have the typical flavours such as savoury, sweet, bitter or tart.

The term "low fat content" means that a product contains no more than 3 g of fats per 100 g of product in the case of solids, whereas in the case of liquid products it means a product that contains no more than 1.5 g of fats per 100 ml of product.

The term "fat-free" means that a product contains no more than 0.5 g of fats per 100 g or 100 ml of product (in the case of solid or liquid products, respectively).

The term "allergen-free" means that no gluten, lactose, eggs, soya, sesame, broad beams, lupins, peanuts, shell fruit, etc. are present, or that the presence of one or more of these substances is below the concentration threshold generally considered as allergising.

"Low calorie content" or "low caloric content" means that a product contains no more than 40 kcal (170 kJ) per 100 g of product in the case of solid products, whereas in the case of liquid products, it means that a product contains no more than 20 kcal (80 kJ) per 100 ml of product.

"Reduced calorie content" or "reduced caloric content" means a product whose energy value is reduced by at least 30% (compared to a reference product).

The present invention relates to an aqueous composition, preferably a food composition, comprising dextrins that are obtained from the partial hydrolysis (chemical and enzymatic) of starch and vegetable bran containing from 2% to 10% by weight of pectins.

The composition preferably comprises 55 to 90% by weight, more preferably 60 to 80% by weight of dextrins, relative to the total weight of the mixture. Dextrins are also definable as soluble fibres and are partially digestible compounds.

The starch from which the dextrins are obtained by partial chemical and enzymatic hydrolysis originates from vegetable sources containing no allergens. In particular, the starch originates from vegetable sources that are gluten free, i.e. with a gluten content of less than 20 ppm, preferably less than 10 ppm, even more preferably less than 5 ppm. Furthermore, the starch originates from vegetable sources that are soy free, i.e. with a soy content of less than 2.4 ppm, preferably less than 2 ppm, even more preferably about 0 ppm (absence of allergens). The starch used in the present invention is tapioca, rice, manioc or corn starch, preferably the starch is a corn and/or tapioca starch.

The dextrins are obtained from the partial hydrolysis of starch by treating the starch with an acid and subsequently treating it with an enzyme of the α-amylase type.

The vegetable bran is rich in insoluble and non-digestible fibres which contribute to imparting the desired texture to the composition of the invention.

Bran is present in the composition of the invention in an amount ranging between 2 and 20% by weight, preferably between 2% and 10% by weight, relative to the total weight of the composition.

The bran comprises from 2% to 10% by weight of pectins (relative to the weight of the bran) and at least 30% by weight (relative to the weight of the bran) of carbohydrates, preferably ranging between 40 and 50%, more preferably between 50 and 95% by weight, and even more preferably between 80 and 95% by weight. The carbohydrates making up the bran are typically glucans, lignins and hemicellulose.

The bran is preferably a vegetable bran containing an amount of pectins ranging between 2% and 10% by weight and is therefore preferably a pea bran, chickpea bran, lentil bran, rice bran, flax bran or millet bran.

The bran that is preferred for the purposes of the invention is chickpea bran.

It is important to select a bran with a high content of pectins, since they contribute to providing the composition of the invention with a consistency and structure such as to be able to avoid the addition of binding agents, structuring agents, humectants, gelling agents etc., which would preclude classifying the composition as a "clean label" product.

Pectins are polysaccharides that show gelling properties both when hot and cold and are composed of a structure formed by chains of galacturonic acid units joined together by α(1→4) bonds. In pectins, homogalacturonic regions are interrupted by rhamnogalacturonic regions, in which the units of rhamnose can be substituted by lateral chains containing arabinose and galactose. In particular, galactans, arabinans, arabinogalactans and/or rhamnogalacturonans are the principal molecules composing the structure of the pectin contained in the bran used in the present composition.

An important aspect of the invention relates to the amount of water present in the composition. In fact, the microbiological stability of the composition, i.e. the inhibition of the formation of moulds and bacteria, which is necessary, therefore, in order to have a good shelf life, is closely connected to the water activity, water content and content of solid substances and the type of carbohydrates present.

For the purpose of obtaining the composition of the present invention with the best structure, consistency and stability, it is important to regulate the water content. In the event of an excessively reduced amount of water, the composition will not be sufficiently hydrated: this precludes obtaining an adequate dispersion of the dextrins and the bran, so that a non-homogeneous and excessively gluey structure of the composition is obtained. In the event that the amount of water is excessive, there is a risk of having too much free water present, which could lead to a release of water by the final composition (drops due to syneresis), thus provoking a lack of homogeneity, the risk of microbial proliferations and, therefore, inferior performance.

The amount of water in the final composition is preferably no greater than 50% by weight, preferably ranging between 20 and 45% by weight, more preferably ranging between 20 and 35% by weight, and even more preferably between 20 and 30% by weight (relative to the total weight of the mixture).

The amount of water contained in the present composition can also be expressed in terms of degrees BRIX of water activity or moisture (i.e. the measurement of the substances in a solid state dissolved in a liquid). In particular, the degrees BRIX of the present composition ranges between 73 and 78° Bx. The value of the water activity of the composition ranges between 0.89 and 0.90. The moisture, by contrast, ranges between 19 and 27% by weight.

These values indicate that the composition of the invention contains a relatively high amount of free water. Despite this, thanks to the absence of sugars available for bacterial proliferation (sugar content of less than 0.5% by weight), the composition proves to be stable and has a long shelf life with no need to add any additives, stabilisers or preservatives.

In one embodiment, the composition comprises 57% to 92% by weight of total solid substances/fibres (both soluble and insoluble), preferably 65 to 80% by weight, and even more preferably 70 to 80% by weight, water being the remaining part to 100.

In one embodiment, the composition comprises 55 to 90% by weight of dextrins (i.e. soluble fibres), more preferably 60 to 80% by weight, 2 to 20% by weight of bran (i.e. insoluble fibres containing a minority part of soluble fibres), preferably 2 to 10% by weight, and an amount of water no greater than 50% by weight, preferably between 20 and 45% by weight, more preferably between 20 and 35% by weight, even more preferably between 20 and 30% by weight.

In one embodiment, the bran content is less than 2% by weight and the content of dextrins ranges between 70 and 80% by weight, the water being the remaining part to 100.

In one embodiment the composition consists of dextrins, vegetable bran containing 2 to 10% by weight of pectins, preferably 3 to 5% by weight of pectins, and water. The amounts of the three ingredients may be variously combined within the limits specified above for each component.

In particular, in one embodiment, the composition of the invention has no added sweeteners.

In another embodiment, the composition has no added additives.

In another embodiment the composition is gluten free, in particular it has a gluten content of less than 20 ppm, preferably less than 10 ppm, and even more preferably less than 5 ppm.

In another embodiment, the composition has a caloric sweetener content 0.5% by weight.

In another embodiment, the aqueous composition comprising dextrins, vegetable bran and water has no added sweeteners or added additives and has a caloric sweetener content 0.5% by weight. Furthermore, the composition is optionally also gluten free, in particular it has a gluten content of less than 20 ppm, preferably less than 10 ppm, and even more preferably less than 5 ppm.

The composition of the invention has semi-solid consistency similar to a syrup. The colour of the composition is slightly amber.

The composition has no flavour (or is flavourless); thanks to this organoleptic characteristic, the composition of the invention is versatile and can thus be used as a basic ingredient for preparing a sweet or savoury food product. The comparative experiments present in the experimental part demonstrate that the composition of the invention can be used as a partial or total substitute for caloric sweeteners for preparing a food product, since it imparts to the product the same body characteristics, sensation on the palate, binding properties, moisture, stability at low and high temperatures and shelf life as are typical of caloric sweeteners.

The invention thus relates to the use of the composition of the invention to prepare a sugar free and/or allergen free food product, in particular a sugar free food product.

Furthermore, the composition of the invention, having no flavour, can also be used as a partial or total substitute for fats for preparing a savoury or unsweet food product. The invention thus also relates to the use of the composition of the invention to prepare a food product that is fat free or has a low fat content. In a preferred embodiment, the composition of the invention is used as a total substitute for fats, when the fat content in the food product is 8-10% by weight relative to the total weight of the product. The invention also relates to the use of the composition of the invention to prepare a food product with a reduced or low calorie content.

The food product that can be prepared with the composition of the invention can be liquid, solid or semi-solid.

The solid food product can be an oven-baked product such as bread, cakes, cake bases, cookies, muffins, brownies, donuts, snacks, ready-to-use mixes for oven-baked products (such as, for example, a ready-made mix for sweet or savoury cakes, or cookies). Other solid food products are for example: cereal bars, shell-fruit and dried-fruit bars, granola bars, breakfast cereals and processed meat.

The semi-solid food product is for example: ice cream, yogurt, milk shakes, puddings and other chilled or frozen desserts, and sweet or savoury salad dressings.

The liquid food product is a beverage, for example a multi-vitamin drink for athletes and others, fruit juices, or reduced-calorie or low-calorie sugar-free diet drinks.

The composition of the invention can also be pre-mixed with other ingredients, such as, for example, flavourings, salt, antioxidants (such as ascorbic acid), high-intensity sweeteners and/or other sweeteners that are alternative to caloric ones prior to being used to prepare the food product.

The invention thus also relates to a composition obtained by mixing the composition of the invention with high-intensity sweeteners and/or other sweeteners that are alternative to caloric ones, or else with salt and/or ready-to-use flavourings, i.e. ready to be used to prepare a sweet or savoury food.

The invention also relates to a kit comprising the composition of the invention and instructions for using the composition and possibly and separately one or more ingredients for preparing a sweet or savoury food. In one embodiment, the kit comprises a pre-mixture of ingredients wherein the composition of the invention is incorporated. The pre-mixture is a ready-to-use mixture, for example for preparing a sweet or savoury cake, pizza, cookies, muffins, pastries, etc. In this case, the kit also comprises instructions for using the pre-mixture in the form of a recipe with an indication of the ingredients necessary to complete the preparation and the relative amounts.

The present invention also relates to a process for preparing the aqueous composition which comprises the steps of:
a) mixing dextrins with water, said dextrins being derived from the partial hydrolysis of starch;
b) heating the mixture to a temperature ranging between 25 and 65° C. under stirring at a rotational speed of at least 100 revolutions/minute and for a period longer than at least 2 minutes until the starch is completely dissolved;
c) adding a vegetable bran containing 2% to 10% by weight of pectins;
d) heating the mixture to a temperature ranging between 25 and 65° C. under stirring at a mixing speed of at least 100 revolutions/minute and for a period longer than at least 4 minutes.

Alternatively, the vegetable bran containing 2 to 10% by weight of pectins is added to the water together with the dextrins in step a). In this case, step d) is directly applied to the mixture of dextrins and bran in water.

In both process alternatives, the composition that is obtained at the end of step d) has a semi-solid consistency, or one similar to a syrup.

The dextrins of step a) are obtained from the partial hydrolysis of starch by means of a process comprising the steps of:
1) treating starch of vegetable origin with a food grade acid in order to obtain dextrins;
2) treating the dextrins with an enzyme;
3) purifying the dextrins by means of activated carbon filters or resins in order to eliminate minerals, proteins and other organic molecules present in a smaller amount;
4) further purifying the dextrins by means of a chromatography column to remove the remaining sugars, in particular those with a degree of polymerisation of 1 or 2.

In one embodiment, after step 4) it is possible to subject the purified dextrins to lyophilisation by means of the "spray drying" technique to obtain a powder.

In step 1) the first hydrolysis of the starch takes place by heating the starch in the presence of a small amount of food grade acid, for example acetic acid, citric acid, hydrochloric acid or phosphoric acid.

Heating is carried out at a temperature ranging between 95 and 145° C. for a period ranging between 1 and 10 hours, preferably at a temperature ranging between 110 and 123° C. for a period ranging between 3 and 6 hours.

This leads to a partial hydrolysis of starch and the obtainment of dextrins. This process, also called "dextrinization", results in a reduction in the molecular weight of the starch and the introduction, into the polysaccharide chain of the starch, of new "non-digestible" glycosidic bonds, both linear and branched, such as, for example, the linear and/or branched α-1,2 and/or β-1,2 glycosidic bonds; β-1,4 glycosidic bonds; α-1,3 and/or β-1,3 glycosidic bonds; and β-1,6 glycosidic bonds. The dextrins of the present invention are characterised in that they have a proportion of 1,6 glycosidic bonds of at least 10% relative to the total bonds as a result of the greater susceptibility of 1,4 glycosidic bonds to the acid treatment and transglycosilation due to the dextrinization process. Non-digestible glycosidic bonds are not hydrolysed by the enzymes of the human digestive system: for this reason dextrins are classified as fibres and, for the purposes of the present invention, they are called "soluble fibres".

In step 2) there is a second hydrolysis, in this case enzymatic. The dextrins of step 1) are in fact treated with an enzyme of the α-amilase type obtained, for example, from *Bacillus licheniformis*. In steps 3) and 4), the dextrins are purified in order to obtain, after step 4), soluble fibres in powder form characterised by having an amount of ash no greater than 10% by weight, preferably ranging between 0.1 and 6% by weight, even more preferably between 0.1 and 4% by weight.

The starch of vegetable derivation is tapioca, rice, manioc or corn starch, preferably the starch is a corn and/or tapioca starch.

The dextrins obtained from the partial hydrolysis of starch according to steps 1) and 2), are mixed in step a) with water at room temperature.

The dextrins are then dissolved in water in step b) by heating the mixture to a temperature ranging between 25 and 65° C., preferably between 25 and 60° C., more preferably between 29 and 54° C., more preferably between 33 and 51° C., and even more preferably between 34 and 44° C. The mixing time must be greater than 2 minutes; it preferably ranges between 2 and 40 minutes, more preferably between 4 and 20 minutes, even more preferably between 5 and 18 minutes, and even more preferably between 7 and 18 minutes. The mixing speed is at least 100 revolutions/minute; it preferably ranges between 200 and 4000 revolutions/minute, more preferably between 200 and 2860 revolutions/minute, even more preferably between 310 and 2500 revolutions/minute, and even more preferably between 500 and 2100 revolutions/minute.

The bran of step c) is obtained by means of a process of physically treating vegetable seeds, the process comprising the steps of peeling or brushing the seeds in order to separate the skin of the seeds, i.e. the bran, from the seeds themselves. This step is followed by a further step of brushing the seeds so as to separate and collect the remaining part of bran that adheres to the seed surface.

The bran collected is then mixed together and subjected to a micronization step in order to obtain a micronized powder.

Before the seeds are peeled or brushed they are preferably cleaned to remove impurities (large, small and/or lights), pebbles and magnetic material so as to assure a high quality of the final product and then selected in such a way as to separate out mouldy seeds or seeds belonging to species other than the seeds useful for the purposes of the invention.

The micronization step is carried out by means of an air flow-type ultra-fine micronizer or by means of other techniques which is known in the industry. The micronizer produces bran in powder form by means of pressure, cutting, grinding and high-frequency vibration.

The micronization of bran allows the insoluble fibres contained therein to be finely dispersed in water, thus making it possible to produce the final composition of the invention with the desired characteristics and properties.

The bran used for the purposes of the invention has a pectin content ranging between 2% and 10% by weight, preferably between 3% and 8% by weight, and is preferably selected from among pea bran, chickpea bran, lentil bran, rice bran, flax bran or millet bran. The bran is preferably chickpea bran.

In step d) the mixture of soluble fibres and bran is heated to a temperature ranging between 25 and 65° C., preferably between 25 and 60° C., more preferably between 29 and 54° C., more preferably between 33 and 51° C., and even more preferably between 34 and 44° C. The mixing time must be greater than 4 minutes; it preferably ranges between 4 and 33 minutes, more preferably between 5 and 31 minutes, even more preferably between 5 and 25 minutes, even more preferably between 5 and 20 minutes, and even more preferably between 5 and 17 minutes. The mixing speed is at least 100 revolutions/minute; it preferably ranges between 200 and 4000 revolutions/minute, more preferably between 200 and 2860 revolutions/minute, even more preferably between 310 and 2500 revolutions/minute, and even more preferably between 500 and 2100 revolutions/minute.

It is important to note that, in order to obtain the final composition of the invention with the desired characteristics and properties, another fundamental parameter, in addition to the micronization of the bran, is the mixing time of steps b) and d), which is crucial in order to be able to assure the dissolution of the fibres and bran in the aqueous mixture of the invention. A time that is too short will not guarantee an adequate dissolution of the fibres and bran, causing the formation of sediment and lumps; if the time is too long, there is a risk of bubbles forming which, by compromising the structure of the mixture, contributes to creating a risk of overflowing.

The process temperature is also a fundamental parameter for ensuring the obtainment of the present composition with the desired characteristics. In particular, at excessively high process temperatures, the portion of sugars and glucans (which are the largest components of the soluble fraction of fibres) tends to darken, causing the composition to turn brown, which is not desirable for many applications in the food industry.

In addition to this, the mixing speed of steps b) and d) also takes on importance in order to have an adequate solubilisation of the fibres and of the bran and thus ensure the obtainment of the final composition desired. Excessively low mixing speeds will not enable a complete homogenisation, whereas excessively high speeds create friction, which produces a rise in temperature that leads to a process of hardening of the dextrins and the bran, creating non-homogeneous points.

In a preferred embodiment, in step d) the mixture is kept under stirring using a vacuum stirring system in order to prevent the formation of bubbles, which would contribute to creating a risk of overflowing with mixing speeds greater than 700 revolutions/minute, preferably greater than 1000 revolutions/minute.

EXAMPLES

Example 1

Table 1 below shows a chemical breakdown of a composition of the present invention comprising an aqueous mixture of dextrins and vegetable bran. The parameters identified are: moisture, ash, proteins, lipids, shown as total lipids and as saturated and unsaturated fatty acids, carbohydrates, shown as total carbohydrates and subdivisions thereof (sugars and fibres), high molecular weight fibres, non-digestible low molecular weight oligosaccharides, low molecular weight oligosaccharides, salt and sugars (monosaccharides and disaccharides) such as fructose, glucose, maltose and lactose.

TABLE 1

Chemical breakdown of a composition comprising partially hydrolysed starch and vegetable bran:

| Parameters | Values | Unit of measurement |
|---|---|---|
| Humidity | 27.44 | g/100 g |
| Ash | <0.05 | g/100 g |
| Proteins (N × 6.25) | 0.23 | g/100 g |
| Lipids | <0.20 | g/100 g |
| Saturated fatty acids | <0.20 | g/100 g |
| Unsaturated fatty acids | <0.20 | g/100 g |
| Carbohydrates | 72.33 | g/100 g |
| of which sugars | <0.5 | g/100 g |
| of which fibres | 72.33 | g/100 g |
| Composition in fibres | | g/100 g |
| Total dietary fibres* | 63.10 | |
| HMWDF*[1] | 27.24 | |
| LMWNDO*[2] | 35.86 | |
| Other LMWO*[3] | 9.23 | |
| Composition in sugar | | g/100 g |
| Fructose | <0.5 | |
| Galactose | <0.5 | |
| Sucrose | <0.5 | |
| Maltose | <0.5 | |
| Lactose | <0.5 | |
| Sum of the sugars | <0.5 | |
| Sodium | 4.9 (□ 0.4) | mg/100 g |

Table 1: Chemical breakdown of a composition comprising partially hydrolysed starch and vegetable bran.
*as non-digestible carbohydrates
*[1]High molecular weight dietary fibres
*[2]Low molecular weight non-digestible oligosaccharides
*[3]Low molecular weight oligosaccharides Example 2

A composition was prepared comprising 49.4% by weight of partially hydrolysed corn starch, 24.7% by weight of partially hydrolysed tapioca starch, 23.8% by weight of water and 2.1% by weight of micronized chickpea bran. The total fibre content of the composition was about the 74% by weight, whereas the total sugar content is <0.5% by weight relative to the total weight of the final composition. The degrees BRIX of the composition were about 74° Bx. Said composition was prepared by adding the corn and tapioca starch, previously mixed, to the water in a reactor set at an initial temperature of 20° C. The mixture was then heated to 37° C. under stirring with a mixing speed set at 2050 revolutions/minute. After the complete dissolution of the starches in water, the chickpea bran was added by means of a controlled continuous metering system. The mixture was then heated to 41° C. under stirring with a mixing speed set at 1050 revolutions/minute.

Example 3

A granola bar was prepared by adding sugars normally used in the industry for this type of product.

The sugars and sugar-based syrups were mixed with the granola and other typical ingredients commonly used in the industry, in the following amounts: 35.4% by weight of granola, 18.4% by weight of extruded milk serum proteins, 12.6% by weight of corn syrup, 6.6% by weight of rice syrup, 5.3% by weight of inverted sugar syrup, 5.4% by weight of coconut margarine, 5.0% by weight of milk serum proteins, 2.7% by weight of toasted almonds, 2.4% by weight of sorbitol, 2.2% by weight of water, 1.1% by weight of honey, 2.6% by weight of fat-free milk powder, 0.2% by weight of salt, and 0.1% by weight of vanilla extract. In particular, said granola bar was prepared by mixing together the granola, the toasted almonds, and the extruded and non-extruded milk serum proteins. The other ingredients were then added to this mixture, with the exception of the vanilla extract and syrups. The latter were heated separately to a temperature of 88° C. and subsequently added to the other ingredients. Once all the ingredients had been added, the mass obtained was compressed to form a 1.5 cm thick layer and allowed to cool, and then cut into bars weighing 40 g each. Finally, each bar was packaged and stored at room temperature in a cool dry place.

The same formulation was then repeated, but part of the sugars was removed and replaced with the food composition of example 2. In particular, the corn and rice syrups were removed, thus drastically reducing the amount of sugars and calories in the finished product. The food composition of example 2 was mixed with the granola and other typical ingredients commonly used in the industry, in the following amounts: 35.4% by weight of granola, 18.4% by weight of extruded milk serum proteins, 24.5% by weight of the food composition of example 2, 3.4% by weight of coconut margarine, 5.0% by weight of milk serum proteins, 2.7% by weight of toasted almonds, 2.4% by weight of sorbitol, 2.2% by weight of water, 1.1% by weight of honey, 2.6% by weight of fat-free milk powder, 0.2% by weight of salt, and 0.1% by weight of vanilla extract. In particular, said granola bar was prepared by mixing together the granola, the toasted almonds, and the extruded and non-extruded milk serum proteins. The other ingredients were then added to this mixture, with the exception of the vanilla extract and the food composition of example 2. The latter was heated separately to a temperature of 88° C. and subsequently added to the other ingredients. Once all the ingredients have been added, the mass obtained was compressed to form a 1.5 cm thick layer and allowed to cool, and then cut into bars weighing 40 g each. Finally, each bar was packaged and stored at room temperature in a cool dry place.

A descriptive sensory analysis was then carried out on the two granola bars to assess their consistency. The test was carried out on a sample of 70 consumers including students and staff of the University of Parma using a 9-point hedonic scale ranging from "dislike extremely (1)" to "like extremely (9)". Every sample was identified with a numerical code and each consumer tasted the samples following a specific pre-established order. The test was performed in standardised booths with a specific lighting system. The granola bars were provided to the consumers together with natural water and savoury crackers to clean out their mouths between one tasting and another. A sensory acceptance index was then calculated. The two bars were crunchy, with a flexible consistency, and retained the same characteristics throughout the whole storage period. The two bars were thus not significantly different in terms of consistency.

Example 4

A cereal bar was prepared by adding sugars normally used in the industry for this type of product. The sugars and sugar-based syrups were mixed with the cereal and other typical ingredients commonly used in the industry, in the following amounts: 24.2% by weight of a mixed preparation of rice flakes and oat flakes, 34.5% by weight of a mixed preparation of dehydrated banana, hazelnuts and corn flakes, 25.9% by weight of glucose syrup, 4.3% by weight of inverted sugar, 5% by weight of vegetable fat (coconut), 0.4% by weight of soy lecithin, 0.2% by weight of salt and 5.5% by weight of water. In particular, said cereal bar was prepared by mixing together the two mixed preparations, to which the other ingredients were then added, with the exception of the inverted sugar and the glucose syrup. The latter were heated separately to a temperature of 88° C. and subsequently added to the other ingredients. Once all the ingredients had been added, the mass obtained was compressed to form a 1.5 cm thick layer and allowed to cool, and then cut into bars weighing 40 g each. Finally, each bar was packaged and stored at room temperature in a cool dry place.

The same formulation was then repeated, but part of the sugars is removed and replaced with the food composition of example 2. In particular, inverted sugar and the glucose and rice syrup, are removed, thus drastically reducing the amount of sugars and calories in the finished product.

The food composition of example 2 is mixed with the cereal and other typical ingredients commonly used in the industry, in the following amounts: 24.2% by weight of a mixed preparation of rice flakes and oat flakes, 34.5% by weight of a mixed preparation of dehydrated banana, hazelnuts and corn flakes, 28.7% by weight of the food composition of example 2, 5% by weight of vegetable fat (coconut), 0.4% by weight of soy lecithin, 0.2% by weight of salt and 7% by weight of water. In particular, said cereal bar was prepared by mixing together initially the two mixed preparations, to which the other ingredients were then added, with the exception of the food composition of example 2. The latter was heated separately to a temperature of 88° C. and subsequently added to the other ingredients. Once all the ingredients had been added, the mass obtained was compressed to form a 1.5 cm thick layer and allowed to cool, and then cut into bars weighing 40 g each. Finally, each bar was packaged and stored at room temperature in a cool dry place. A descriptive sensory analysis was then carried out on the two cereal bars obtained to assess their consistency. The test was carried out on a sample of 70 consumers including students and staff of the University of Parma using a 9-point hedonic scale ranging from "dislike extremely (1)" to "like extremely (9)". Every sample was identified with a numerical code and each consumer tasted the samples following a specific pre-established order. The test was performed in standardised booths with a specific lighting system. The granola bars were provided to the consumers together with natural water and savoury crackers to clean out their mouths between one tasting and another. A sensory acceptance index was then calculated. The two bars were crunchy, with a flexible consistency, and retained the same characteristics throughout the whole storage period. The two bars were thus not significantly different in terms of consistency.

Example 5

A gluten-free bread loaf (of the type for toasting) was prepared using a gluten-free sugar-based syrup commonly used in the industry and available on the market as "MoisturLok®" and other typical ingredients in the following amounts: 9.7% by weight of native potato starch, 26.5% by weight of native corn starch, 1% by weight of salt, 8.4% by weight of HI-Nucleus BRD M03 (commercially available semi-finished product manufactured by the same Applicant which mimics the functionality of the structure of gluten), 43% by weight of water, 2.5% by weight of sunflower oil, 1% by weight of fresh yeast, 1.5% by weight of sucrose, 4.9% by weight of rice flour, 0.3% by weight of HI-Shield P (natural preservative manufactured by the same Applicant) and 1.3% by weight of MoisturLok®. In particular, said gluten-free bread was prepared by mixing together the powder ingredients for about 2 minutes until obtaining a homogeneous mixture. Water, yeast and MoisturLok® were added, followed by mixing for 4-6 minutes at a moderate speed in a conventional mixer. The dough obtained was allowed to rest for 40-50 minutes at 30–32° C. with a relative moisture of 85%. Said dough was then baked in an oven at 190-200° C. for 50-60 minutes, preferably with the injection of steam at the start of the baking process. Finally, the product obtained was packaged in heat-sealed plastic bags with a packaging system using modified atmosphere injection technology. Said modified atmosphere was composed of a mixture of nitrogen and carbon dioxide in a 70:30 ratio.

The same formulation was then repeated, removing all the added sugars (MoisturLok®) and replacing them, in a 1:1 ratio, with the food composition of example 2. In this case the ingredients used to obtain the formulation were the following: 9.7% by weight of native potato starch, 26.5% by weight of native corn starch, 1% by weight of salt, 8.4% by weight of HI-Nucleus BRD M03 (commercially available semi-finished product manufactured by the same Applicant which mimics the functionality of the structure of gluten), 43% by weight of water, 2.5% by weight of sunflower oil, 1% by weight of fresh yeast, 1.5% by weight of sucrose, 4.9% by weight of rice flour, 0.3% by weight of HI-Shield P (natural preservative manufactured by the same Applicant) and 1.3% by weight of the food composition of example 2. In particular, the gluten-free bread according to this second formulation was prepared by mixing together the powder ingredients for about 2 minutes until obtaining a homogeneous mixture. Water, yeast and the food composition of example 2 were added, followed by mixing for 4-6 minutes at a moderate speed in a conventional mixer. The dough obtained was allowed to rest for 40-50 minutes at 30-32° C. with a relative moisture 85%. Said dough was then baked in an oven at 190-200° C. for 50-60 minutes, preferably with the injection of steam at the start of the baking process. Finally, the product obtained was packaged in heat-sealed plastic bags with a packaging system using modified atmosphere injection technology. Said modified atmosphere was composed of a mixture of nitrogen and carbon dioxide in a 70:30 ratio.

Figure 1:
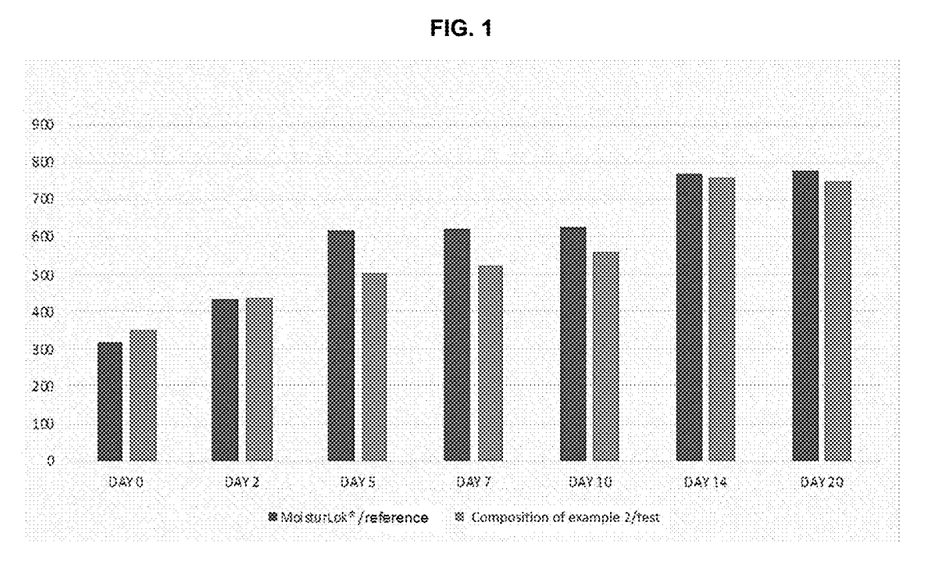
FIG. 1 shows the results of a comparison between the hardness levels of bread produced with MoisturLok® and bread produced by replacing MoisturLok® with the food composition of example 2.

Both samples were stored at room temperature in a cool dry place. For the purpose of assessing the shelf life of the samples in terms of texture, specific analyses were performed by means of a "texture analyser". In particular, the properties of texture were determined using a TA.XT2 Texture Analyser (Stable Micro Systems, 124 Godalming, UK) and the data were analysed by means of Texture Expert software (Stable Micro Systems, 124 Godalming, UK). The most evident effect of using a sugar-based syrup for making bread relates to hardness. Hardness is the value corresponding to the peak of force that is measured during the first compression of the sample. For this reason, hardness measurements of the two bread samples were taken over a storage period of 20 days (shelf life). FIG. 1 shows the results of a comparison between the hardness levels of bread made with MoisturLok® and bread made by replacing MoisturLok® with the food composition of example 2.

It may be observed that both bread samples show the same levels of hardness (and thus also of softness) during the 20-day storage period.

Example 6

A gluten-free, allergen-free vegetable drink was prepared starting from a selected rice flour. Amylolitic enzymes were added in order to obtain a partial degradation of the rice starch contained in the rice flour so as to obtain free sugars. A sugar- and inverted sugar-based syrup was added to increase the density of the rice drink and make it thicker and more viscous, and pleasing to the palate. Said sugar-containing rice drink was prepared using the following ingredients: 94% by weight of rice flour, 4% by weight of water, 1% by weight of inverted sugar and 1% by weight of golden syrup. The rice flour was dissolved in water by using a special heated mixer (Polyfunctional Qbo 8-3, Roboqbo Bologna, IT) with a blade rotation speed of 2000 revolutions/minute. The temperature was simultaneously raised to 85° C. and thus maintained for 7 minutes in order to assure that the rice starch was thoroughly dissolved and totally gelatinised. The golden syrup and the inverted sugar were added to the mixture obtained by means of a vacuum system and the whole mixture was mixed for 2 minutes at a speed of 1000 revolutions/minute. The sugar-containing rice drink obtained was then bottled and the bottles pasteurised at 85° C. for about 7 minutes.

The same formulation was then repeated, removing all the added sugars, namely, the golden syrup and the inverted sugar, and replacing them with the food composition of example 2 in a 1:1 ratio. In this case, the drink was thus prepared using: 94% by weight of rice flour, 4% by weight of water, and 12% by weight of the food composition of example 2. The rice flour was dissolved in water by using a special heated mixer (Polyfunctional Qbo 8-3, Roboqbo Bologna, IT) with a blade rotation speed of 2000 revolutions/minute. The temperature was simultaneously raised to 85° C. and thus maintained for 7 minutes in order to assure that the rice starch was thoroughly dissolved and totally gelatinised. The food composition of example 2 was added to the mixture obtained by means of a vacuum system and the whole mixture was mixed for 2 minutes at a speed of 1000 revolutions/minute. The sugar-free rice drink obtained was then bottled and the bottles pasteurised at 85° C. for about 7 minutes. The bottles containing both rice drinks were stored at room temperature in a cool dry place.

A descriptive sensory analysis was then carried out on the two rice drinks obtained to assess their consistency/viscosity, sensation on the palate, appearance and obtain an overall assessment of the drink. The test was carried out on a sample of 70 consumers including students and staff of the University of Parma using a 4-point scale ranging from "dislike extremely (1)" to "like very much (4)". Every sample was identified with a numerical code and each consumer tasted the samples following a specific pre-established order. The test results are shown in Table 2 and show that the standard product (sugar-containing drink) and the test product (drink with sugar replaced by the food composition of example 2) are equivalent, with a preference towards the second product in reference to the tested characteristics.

TABLE 2

| | Descriptive sensory analysis | | | |
|---|---|---|---|---|
| Type of rice drink | Viscosity/ density | Sensation on the palate | Appearance | Overall assessment |
| With sugar | 2.7 | 2.2 | 2.0 | 2.2 |
| With no added sugar | 3.2 | 3.2 | 2.0 | 3.2 |

Table 2: Results of the descriptive sensory analysis on the two rice drinks analysed.

Example 7

A traditional sponge cake was prepared with wheat flour and eggs using added glucose syrup to increase softness and freshness. Said sponge cake was prepared using the following ingredients: 40.3% by weight of liquid whole eggs, 16.1% by weight of wheat flour, 9.7% by weight of native potato starch, 8.1% by weight of sucrose, 25.8% of glucose syrup (44 DE). The liquid whole eggs, sugar and glucose syrup were mixed together in a planetary mixer for 7 minutes at maximum speed using a beater. The wheat flour and the native potato starch were added and the batter was mixed at medium speed for 4 minutes. The batter obtained was then placed in a baking pan at 190° C. for 25 minutes so as to obtain 350 g of product per sample of sponge cake.

The same formulation was then repeated, removing the glucose syrup and a small percentage of sucrose and replacing them with the food composition of example 2. In this case, the sponge cake was prepared using: 37.9% by weight of liquid whole eggs, 15.2% by weight of wheat flour, 9.0% by weight of native potato starch, 7.6% by weight of sucrose, and 24.2% by weight of the food composition of example 2. The liquid whole eggs, the sugar and the food composition of example 2 were mixed together in a planetary mixer for 7 minutes at maximum speed using a beater. The wheat flour and the native potato starch were added and the batter was mixed at medium speed for 4 minutes. Finally, the water was added and the batter was mixed for an additional 2 minutes a medium speed. The batter obtained was then placed in a baking pan at 190° C. for 25 minutes so as to obtain 350 g of product per sample of sponge cake. Both samples (reference and test) were stored at room temperature in a cool dry place. For the purpose of assessing the shelf life of the samples in terms of texture, specific analyses were performed by means of a "texture analyser". In particular, the properties of texture were determined using a TA.XT2 Texture Analyser (Stable Micro Systems, 124 Godalming, UK) and the data were analysed by means of Texture Expert software (Stable Micro Systems, 124 Godalming, UK). In general, sugar-based syrups play a key role in the production of oven-baked products, for example by improving crumb consistency, increasing softness, retaining water and increasing the shelf life.

Figure 2:
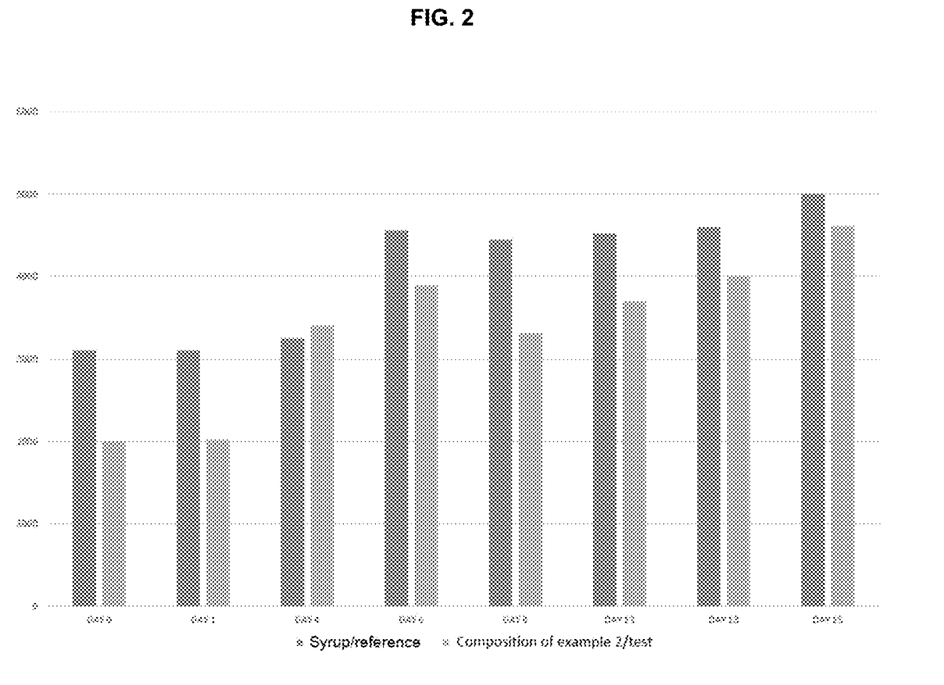
FIG. 2 shows the results of a comparison between the hardness levels of sponge cake produced with a glucose-based syrup and sponge cake produced by replacing said syrup with the food composition of example 2.
Figure 3:
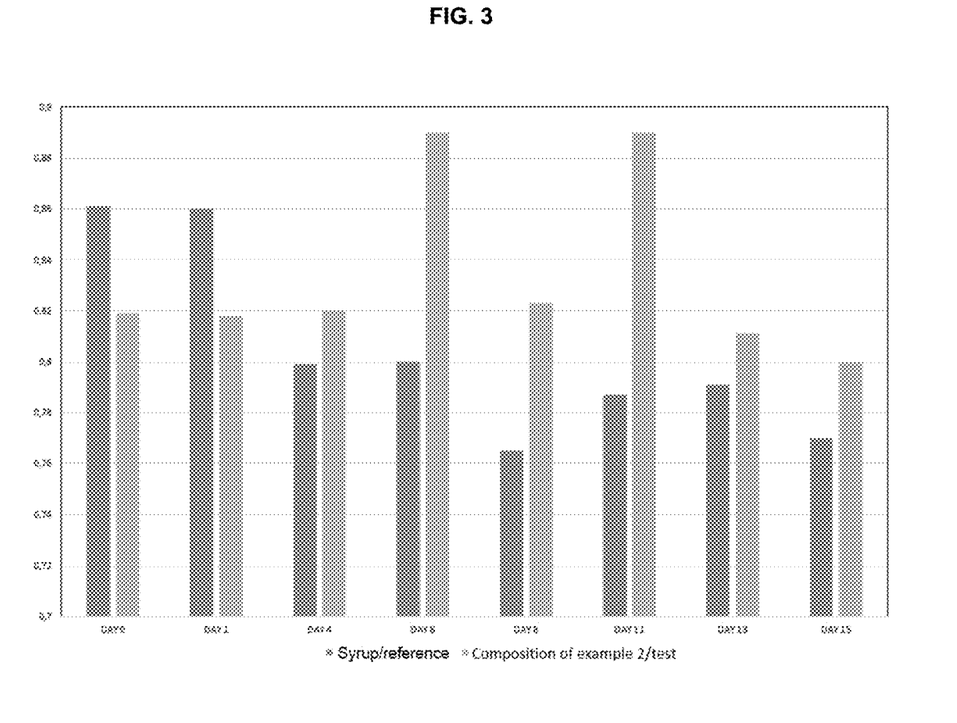
FIG. 3 shows the results of a comparison between the elasticity levels of sponge cake produced with a glucose-based syrup and sponge cake produced by replacing said syrup with the food composition of example 2.

The most evident effect of using a sugar-based syrup for making such products, such as, for example, sponge cake, can be measured in terms of hardness and elasticity (springiness). Hardness is the value corresponding to peak of force that is measured during the first compression of the sample, elasticity is the speed at which a deformed sample returns to its size and shape. For this reason, hardness and elasticity measurements of the two sponge cake samples were taken over a storage period of 15 days (shelf life). FIGS. 2 and 3 show, respectively, the results in terms of levels of hardness and elasticity in the comparison between the sponge cake made with glucose syrup and the sponge cake made by replacing said syrup with the food composition of example 2.

From the graph shown in FIG. 2, it may be noted that there is a small difference in terms of hardness between the sponge cake made with glucose syrup (standard) and the one made by replacing said syrup with the food composition of example 2 (test) over the 15 day storage period (shelf life). It is possible to conclude that replacing glucose syrup with the food composition of example 2 leads to a slight improvement in the properties imparting texture, given that the softness (i.e. the concept opposite to hardness) shows to be more or less equivalent or even greater in the test sample versus the standard sample.

The same can be said for elasticity. As may be noted in the graph in FIG. 3, the test sample has the same or even greater elasticity compared to the standard sample.

What is claimed is:

1. An aqueous composition consisting essentially of water, and dextrins that are obtained from the partial hydrolysis of starch and vegetable bran that contains 2 to 10% by weight of pectins.

2. The composition according to claim 1, comprising 55 to 90% by weight of dextrins, by weight, relative to the total weight of the composition.

3. The composition according to claim 1, wherein bran is in an amount ranging between 2 and 20% by weight, relative to the total weight of the composition.

4. The composition according to claim 1, wherein the amount of water is no greater than 50% by weight, relative to the total weight of the composition.

5. The composition according to claim 1, wherein the starch is tapioca starch, rice starch, manioc starch or corn starch.

6. The composition according to claim 1, wherein the bran is pea bran, chickpea bran, lentil bran, rice bran, flax bran or millet bran.

7. The composition according to claim 1, wherein the caloric sweetener content is ≤0.5% by weight.

8. The composition according to claim 1, wherein the composition has no added sweeteners and/or added additives and/or a gluten content of less than 20 ppm.

9. The composition according to claim 1, wherein the composition has no flavour or is tasteless.

10. The composition according to claim 1, wherein the composition has a semi-solid consistency similar to a syrup.

11. A food product prepared with the composition according to claim 1, and selected from among oven-baked products consisting of: bread, cakes, cake bases, cookies, muffins, brownies, donuts, snacks, pre-prepared mixes for oven-baked products, cookies, cereal bars, shell-fruit bars dried-fruit bars, granola bars, breakfast cereals, processed meat, ice cream, yogurt, milk shakes, pudding, sweet or savoury salad dressing, multi-vitamin drinks for athletes, fruit juices, reduced calorie and low-calorie sugar free diet drinks.

12. The composition according to claim 2, wherein bran is in an amount ranging between 60 to 80% by weight, relative to the total weight of the composition.

13. The composition according to claim 3, wherein bran is in an amount ranging between 2 and 10% by weight, relative to the total weight of the composition.

14. The composition according to claim 4, wherein the amount of water is between 20 and 45% by weight, relative to the total weight of the composition.

15. The composition according to claim 4, wherein the amount of water is between 20 and 35% by weight, relative to the total weight of the composition.

16. The composition according to claim 4, wherein the amount of water is between 20 and 30% by weight, relative to the total weight of the composition.

17. The composition according to claim 5, wherein the starch is a corn and/or tapioca starch.

18. The composition according to claim 6, wherein the bran is chickpea bran.

19. The composition according to claim 8, wherein the gluten content is less than 10 ppm.

20. The composition according to claim 8, wherein the gluten content is less than 5 ppm.

* * * * *